(12) United States Patent
Schaefer

(10) Patent No.: US 12,141,028 B2
(45) Date of Patent: Nov. 12, 2024

(54) ERROR STATUS DETERMINATION AT A MEMORY DEVICE

(71) Applicant: Micron Technology, Inc., Boise, ID (US)

(72) Inventor: Scott E Schaefer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 70 days.

(21) Appl. No.: 17/959,902

(22) Filed: Oct. 4, 2022

(65) Prior Publication Data

US 2024/0111626 A1 Apr. 4, 2024

(51) Int. Cl.
*G06F 11/10* (2006.01)
*G06F 11/07* (2006.01)

(52) U.S. Cl.
CPC ...... *G06F 11/1068* (2013.01); *G06F 11/0772* (2013.01); *G06F 11/0784* (2013.01)

(58) Field of Classification Search
CPC ............. G06F 11/1068; G06F 11/0784; G06F 11/0772; G11C 11/406; G11C 11/4087
See application file for complete search history.

(56) References Cited

U.S. PATENT DOCUMENTS

| | | | | |
|---|---|---|---|---|
| 7,526,713 B2 * | 4/2009 | Klein | .............. | G06F 11/106 714/763 |
| 2005/0289444 A1 * | 12/2005 | Klein | .............. | G11C 11/4096 714/793 |
| 2009/0327800 A1 * | 12/2009 | Kim | .............. | G06F 11/1044 714/5.11 |
| 2015/0067446 A1 * | 3/2015 | Yen | .............. | H03M 13/3723 714/768 |

* cited by examiner

*Primary Examiner* — Guy J Lamarre
(74) *Attorney, Agent, or Firm* — Holland & Hart LLP

(57) ABSTRACT

Methods, systems, and devices for error status determination at a memory device are described. A memory device may generate, based on syndrome bits for a codeword read from a memory, an error detection signal for the codeword that indicates whether an error has been detected in the codeword. The memory device may generate, based on the syndrome bits, an error correction signal for the codeword that indicates whether an error has been corrected in the codeword. And the memory device may provide an indication of the error detection signal and an indication of the error correction signal to a host device.

21 Claims, 8 Drawing Sheets

ERROR STATUS DETERMINATION AT A MEMORY DEVICE

FIELD OF TECHNOLOGY

The following relates to one or more systems for memory, including error status determination at a memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A memory device may use an error correction technique (e.g., an error correction code (ECC) scheme) to detect and potentially correct errors in codewords stored in the memory device. But a host device that receives a codeword from a memory device may be unaware of the errors detected or corrected in a codeword, which may prevent the host device from taking compensatory action. In certain high-reliability applications (e.g., in automotive safety), techniques for determining the error status of codewords communicated to the host device may be desired.

According to the techniques described herein, a memory device may enable the determination of an error status of a codeword by generating a quantity of signals that indicate various error information for the codeword. For example, the memory device may use syndrome bits for the codeword to generate one or more of A) an error detection signal that indicates whether an error has been detected in the codeword, B) an error correction signal that indicates whether an error has been corrected in the codeword, or C) a multi-bit error signal that indicates whether a multi-bit error has been detected in the codeword. The signals may be used by the memory device or a host device to determine the error status of the codeword, among other actions.

Features of the disclosure are initially described in the context of systems and memory devices as described with reference to FIGS. 1 and 2. Features of the disclosure are described in the context of a process flow and logic circuits as described with reference to FIGS. 3 through 6. These and other features of the disclosure are further illustrated by and described with reference to an apparatus diagram and flowcharts that relate to error status determination at a memory device as described with reference to FIGS. 7 through 8.

Figure 1:
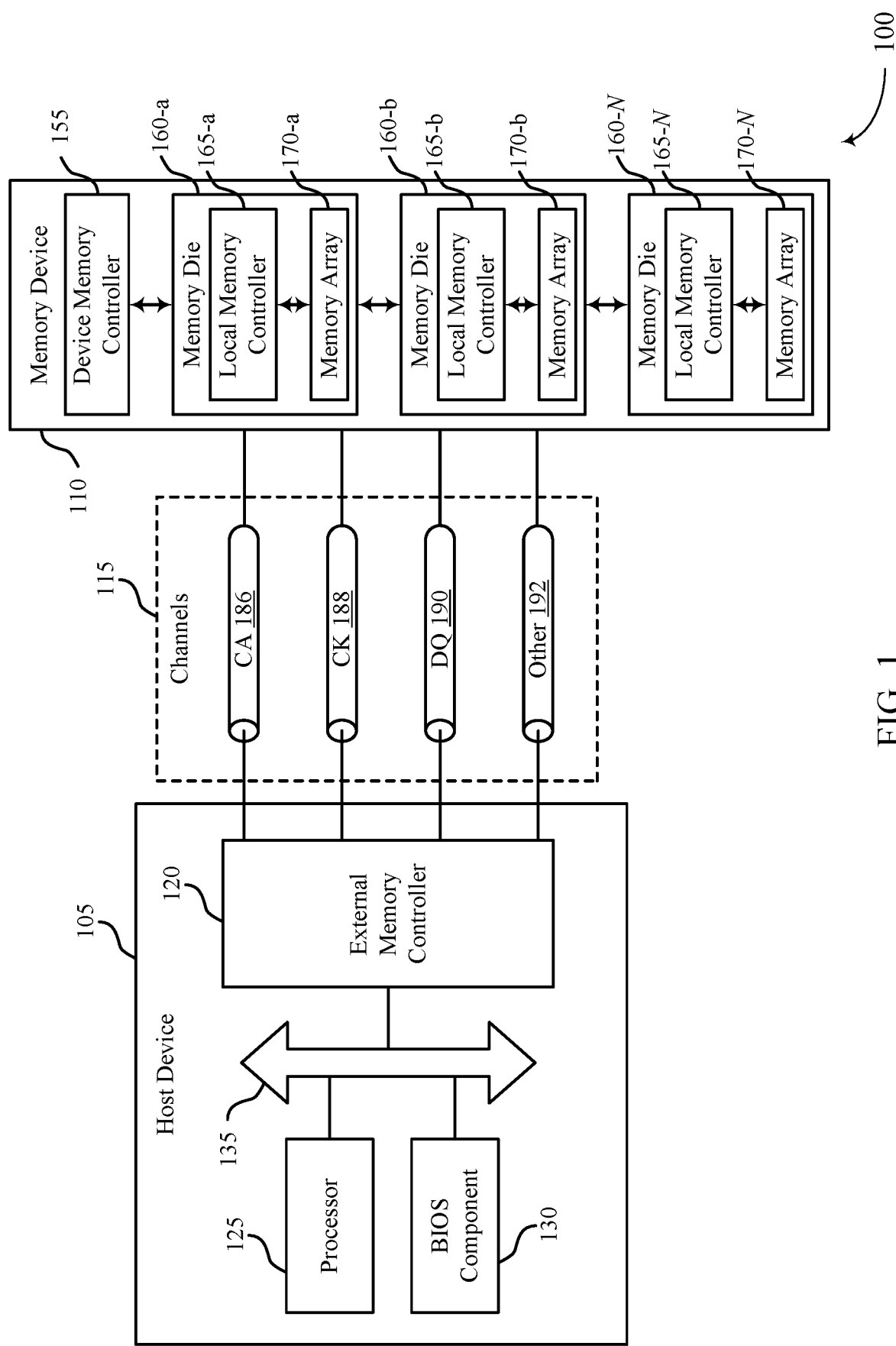
FIG. 1 illustrates an example of a system that supports error status determination at a memory device in accordance with examples as disclosed herein.

FIG. 1 illustrates an example of a system 100 that supports error status determination at a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device may use an on-device error correction technique to detect and potentially correct errors in information stored in the memory device. For example, a memory device may use an ECC scheme to detect and correct errors that arise in stored codewords. A codeword may refer to a combination of data bits and parity bits that are generated based on the data bits. For example, each parity bit in a codeword may be generated by exclusive-ORing (XORing) a subset of the data bits according to the error correction code. In some examples, a memory device may use a single-error-correction double-error-detection (SECDED) ECC scheme to detect multi-bit errors (MBEs) and correct single-bit errors (SBEs). But a host device that receives a codeword from the memory device may be unaware of the error status of the codeword, which may prevent the host device from taking appropriate action.

According to the techniques described herein, a memory device 110 may generate a quantity of signals that indicate the error status of a codeword. For example, the memory device 110 may generate an error detection signal that indicates whether an error has been detected in the codeword. The error detection signal may be generated by ORing the syndrome bits for the codeword. The memory device 110 may additionally or alternatively generate an error correction signal that indicates whether an error has been corrected in the codeword. The error correction signal may be generated by separately comparing the syndrome bits for the codeword with different syndrome codes associated with error correction. The memory device 110 may additionally or alternatively generate a multi-bit error signal that indicates whether a multi-bit error has been detected in the codeword. The multi-bit error signal may be generated by separately comparing the syndrome bits for the codeword with syndrome codes associated with multi-bit errors.

The memory device 110 may indicate the error status associated with the signals (or the signals themselves) to the host device 105 so that the host device 105 can take appropriate action based on the error status of the codeword. A signal may also be referred to as a flag, an indication, or other suitable terminology. In some examples, a signal may be one or more bits.

Figure 2:
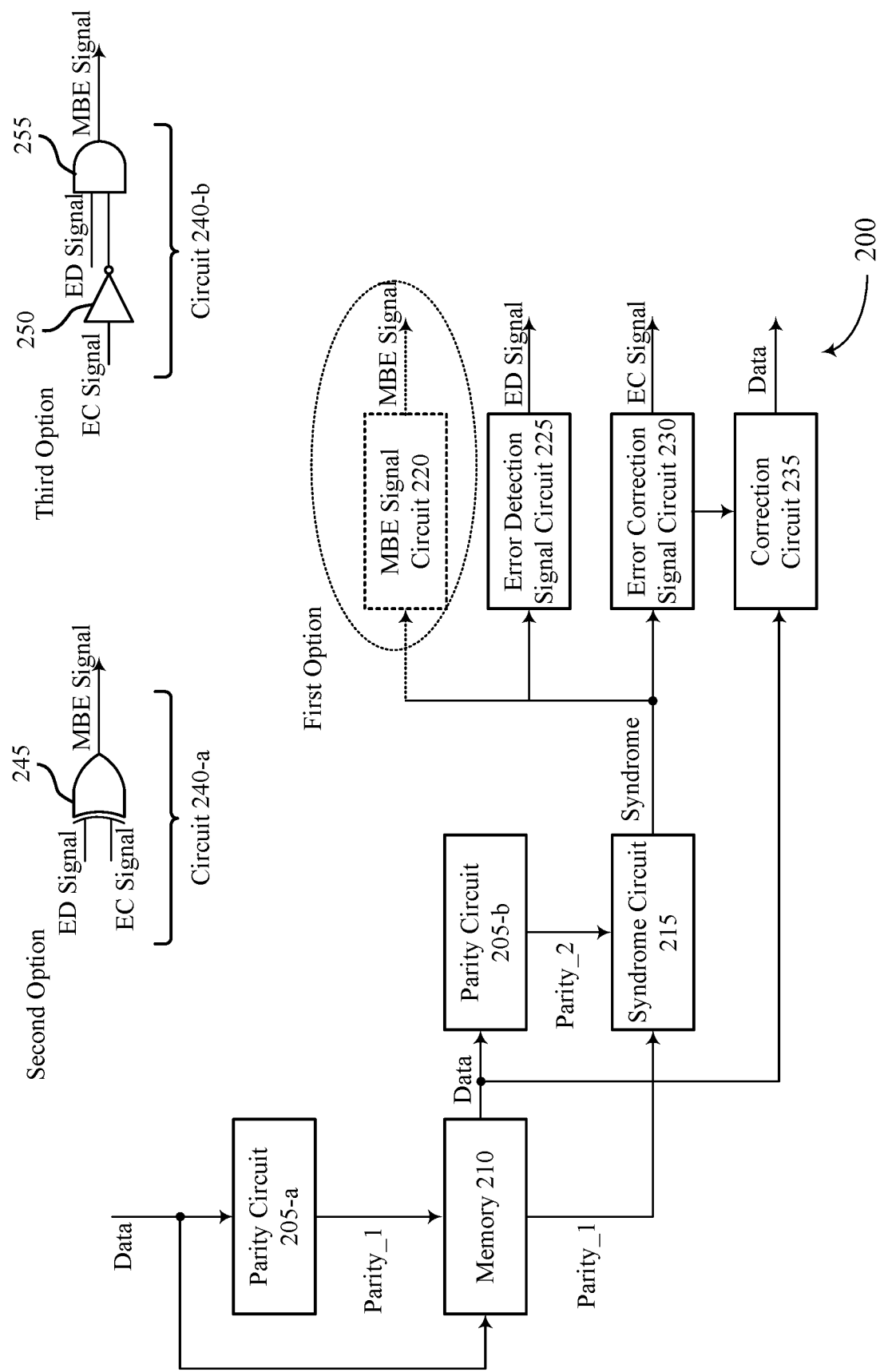
FIG. 2 illustrates an example of a memory device that supports error status determination in accordance with examples as disclosed herein.

FIG. 2 illustrates an example of a memory device 200 that supports error status determination in accordance with examples as disclosed herein. The memory device 200 may be an example of a memory device 110 as described with reference to FIG. 1. The memory device 200 may include a quantity of circuits configured to generate signals that indicate the error status of a codeword.

At a high level, the memory device 200 may read a codeword from the memory 210 and use one or both of the parity circuit 205-*b* or the syndrome circuit 215 to generate syndrome bits for the codeword. The memory device 200 may use the syndrome bits and the error detection signal circuit to generate the error detection (ED) signal, and may use the syndrome bits and the error correction signal circuit 230 to generate the error correction (EC) signal. The memory device 200 may use the syndrome bits and the MBE signal circuit 220 (or the error detection flag, the error correction flag, and one of the alternative circuits 240) to generate the multi-bit error signal. If there is a correctable error in the codeword, the memory device 200 may use the correction circuit 235 to correct the error in the codeword. The memory device 200 may include means for (e.g., an interface, one or more pins, one or more traces, a bus) communicating the signals to a host device.

The memory 210 may be configured to store information, such as codewords. For example, the memory 210 may store a codeword that includes data bits and a first set of parity bits (Parity_1) that is based on the data bits. The first set of parity bits may be generated by the parity circuit 205-*a*, which may be configured to generate parity bits for sets of data bits that are to be stored in the memory 210. In some examples, the parity circuit 205-*a* may also generate a first double-error-detection (DED) bit for the codeword that indicates whether the codeword has an even quantity of logic 1s or an odd quantity of logic 1s. The DED bit may be generated based on the data bits in the codeword and the parity bits in the codeword (e.g., the first set of parity bits (Parity_1)).

The parity circuit 205-*b* may be configured to generate a second set of parity bits (Parity_2) for the codeword. The parity circuit 205-*b* may be configured to generate the second set of parity bits for the codeword based on the data bits in the codeword, which may be received from the memory 210. For example, the second set of parity bits may be generated by performing a logic operation, such as an XOR operation, of the data bits. In some examples, the parity circuit 205-*b* may also generate a second DED bit for the codeword based on the data bits in the codeword and the second set of parity bits (e.g., Parity_2).

The syndrome circuit 215 may be configured to generate syndrome bits (which may be referred to as syndrome) for the codeword based on the first set of parity bits and the second set of parity bits. The first set of parity bits may be received from the memory 210 and the second set of parity bits may be received from the parity circuit 205-b. In some examples, the syndrome circuit 215 may generate the syndrome bits by XORing each parity bit in the first set of parity bits (Parity_1) with a corresponding parity bit in the second set of parity bits (Parity_2). To illustrate, a first syndrome bit (S0) may be generated by XORing the first parity bit (P0) in the first set of parity bits may be XORed and the first parity bit (P0) in the second set of parity bits, a second syndrome bit (S1) may be generated by XORing the second parity bit (P1) in the first set of parity bits may be XORed and the second parity bit (P1) in the second set of parity bits, and so on and so forth. If the codeword has an error the syndrome bits may be non-zero; if the codeword is errorless the syndrome bits may be zeros.

If the syndrome circuit 215 generates x syndrome bits (e.g., 16 syndrome bits), the quantity of possible bit combinations (referred to as syndrome codes) may be $2^x$ (e.g., $2^{16}$=65,536 syndrome codes). Of the possible syndrome codes, some syndrome codes may be associated with a single bit error (referred to as SBE syndrome codes), other syndrome codes may be associated with a multi-bit error (referred to as MBE syndrome codes), and one syndrome code may be associated with an errorless codeword.

To illustrate, consider an example in which the memory device 200 uses x parity bits (e.g., 16) and no DED bit, and the codeword has y data bits (e.g., 256 data bits). In such an example, there may be y (e.g., 256) SBE syndrome codes (e.g., one SBE syndrome code for each possible single bit error). And there may be $2^x-(y+1)$ MBE syndrome codes (e.g., 65,536−(256+1)=65,279 MBE syndrome codes, one for each syndrome code not associated with a single-bit error or an errorless codeword). An SBE syndrome code may indicate the location of the error in the codeword.

As another illustration, consider an example in which the memory device 200 uses x−1 parity bits (e.g., 15) and a DED bit, and the codeword has y data bits (e.g., 256 data bits). In such an example, there may be y (e.g., 256) SBE syndrome codes (e.g., one SBE syndrome code for each possible single bit error). And there may be $2^{x-1}-(y+1+1)$ MBE syndrome codes (e.g., 32,768−(258)=32,510 MBE syndrome codes. So, use of a DED bit and fewer parity bits may reduce the quantity of MBE syndrome codes.

The MBE signal circuit 220 may generate the MBE signal based on the syndrome bits and the MBE syndrome codes. For example, the MBE signal circuit 220 may compare (e.g., XOR) the syndrome bits (and potentially the DED bit, if present) with the MBE syndrome codes and OR the resulting bits to generate the MBE signal.

Although shown with the MBE signal circuit 220 (a configuration referred to as the first option), the memory device 200 may generate the MBE signal using a different circuit 240 (in which case the memory device 200 may potentially omit the MBE signal circuit 220). In the first option, the MBE signal may be a logic 0 (MBE Signal=0) if the codeword is free of a multi-bit error and may be a logic 1 (MBE Signal=1) if the codeword has a multi-bit error. The circuits 240 may take up less space than the MBE signal circuit 220.

Additionally or alternatively, in a second option, the circuit 240-a may generate the MBE signal by exclusive-ORing (XORing) (e.g., via an XOR gate 245) the error detection signal and the error correction signal. The circuit 240-a may be coupled with the output pin of the error detection signal circuit 225 and the output pin of the error correction signal circuit 230. Table 1 provides the error status and the logic value of the MBE signal for the second option.

TABLE 1

| MBE Signal for Second Option | | | |
|---|---|---|---|
| ED signal | EC signal | MBE Signal | Error Status |
| 0 | 0 | 0 | Errorless |
| 0 | 1 | 1 | Circuit fault |
| 1 | 0 | 1 | Multi-bit error |
| 1 | 1 | 0 | Single-bit error |

Additionally or alternatively, in a third option, the circuit 240-b may generate the MBE signal by inverting (e.g., via the inverter 250) the error correction signal and then ANDing (e.g., via the AND gate 255) the inverted error correction signal and the error detection signal. Table 2 provides the error status and the logic value of the MBE signal for the third option.

TABLE 2

| MBE Signal for Second Option | | | |
|---|---|---|---|
| ED signal | EC signal | MBE Signal | Error Status |
| 0 | 0 | 0 | Errorless |
| 0 | 1 | 0 | Circuit fault |
| 1 | 0 | 1 | Multi-bit error |
| 1 | 1 | 0 | Single-bit error |

The error detection signal circuit 225 may generate the error detection signal based on the syndrome bits generated by the syndrome circuit 215. For example, the error detection signal circuit 225 may OR the syndrome bits to generate the error detection signal. The error detection signal may be a logic 0 (ED Signal=0) if the codeword is error less and may be a logic 1 (ED Signal=1) if the codeword has an error.

The error correction signal circuit 230 may generate the error correction signal based on the syndrome bits (and potentially the DED bit) and the SBE syndrome codes. For example, the error correction signal circuit 230 may compare (e.g., XOR) the syndrome bits (and potentially the DED bit, if present) with the SBE syndrome codes and OR the resulting bits to generate the SBE signal.

The correction circuit 235 may correct an error in the codeword based on control information (e.g., an indication of the SBE syndrome code that matches the syndrome bits) received from the error correction signal circuit 230. For example, the correction circuit 235 may invert a bit that has an error based on the location (e.g., position) of the bit being indicated by the control information. The memory device 200 may communicate the data bits of the codeword to a host device (potentially after correcting an error in the data bits).

In some examples, a device (e.g., the memory device 200, the host device) may use a table to determine the error status of the codeword. For example the device may use Table 3 to determine the error status of the codeword. According to Table 3, the device may determine that the codeword is errorless if ED Signal=0, EC Signal=0, and MBE Signal=0; the device may determine that there is a circuit error if ED Signal=0, EC Signal=1, and MBE Signal=1; the device may determine that there is a multi-bit error if ED Signal=1, EC Signal=0, and MBE Signal=1; and the device may determine that there is single-bit error if ED Signal=1, EC Signal=1, and MBE Signal=0.

TABLE 3

Error Status Mapping

| ED Signal | EC Signal | MBE Signal | Error Status |
|---|---|---|---|
| 0 | 0 | 0 | Errorless |
| 0 | 1 | 1 | Circuit error |
| 1 | 0 | 1 | Multi-bit error |
| 1 | 1 | 0 | Single-bit error |

In some examples, the memory device 200 may provide an indication of the error status for codeword by writing an indication of the error status to one or more mode host-accessible registers at the memory device 200 for the host device to read. For example, the memory device 200 may write the error status to a mode register. In other examples, the memory device 200 may provide the error status by writing indications of the various signals (e.g., one or more of the error detection signal, the error correction signal, the multi-bit error signal) to one or more registers at the memory device 200 for the host device to read. The host device may read the register(s) periodically or in response to a trigger condition (e.g., receipt of a prompt from the memory device 200).

In some examples, the memory device 200 may provide the error status of the codeword by transmitting an indication of the error status to the host device (e.g., via a communication bus between the memory device 200 and the host device). In other examples, the memory device 200 may provide an indication of the error status by transmitting indications of the signals to the host device (e.g., via a communication bus between the memory device 200 and the host device).

The host device may determine the error status of a codeword based on the indication of the error status provided by the memory device 200 and may take one or more actions based on the error status(es). For example, if the error status(es) indicate that the data received by the host device is errorless, the host device may process the data. If the error status indicates that the received data has an uncorrectable error (e.g., a multi-bit error), the host device may discard the data and enter a safety mode. If the error status indicates that the codeword had a correctable error (e.g., a single-bit error), the host device may record the address associated with that codeword as part of an error-logging process for ensuring the reliability of the memory device 200. For example, the host device may retire (e.g. no longer use) a portion (e.g., a row) of memory if a threshold quantity of errors accumulate in the row. Other actions by the host device are contemplated and within the scope of the present disclosure.

Figure 3:
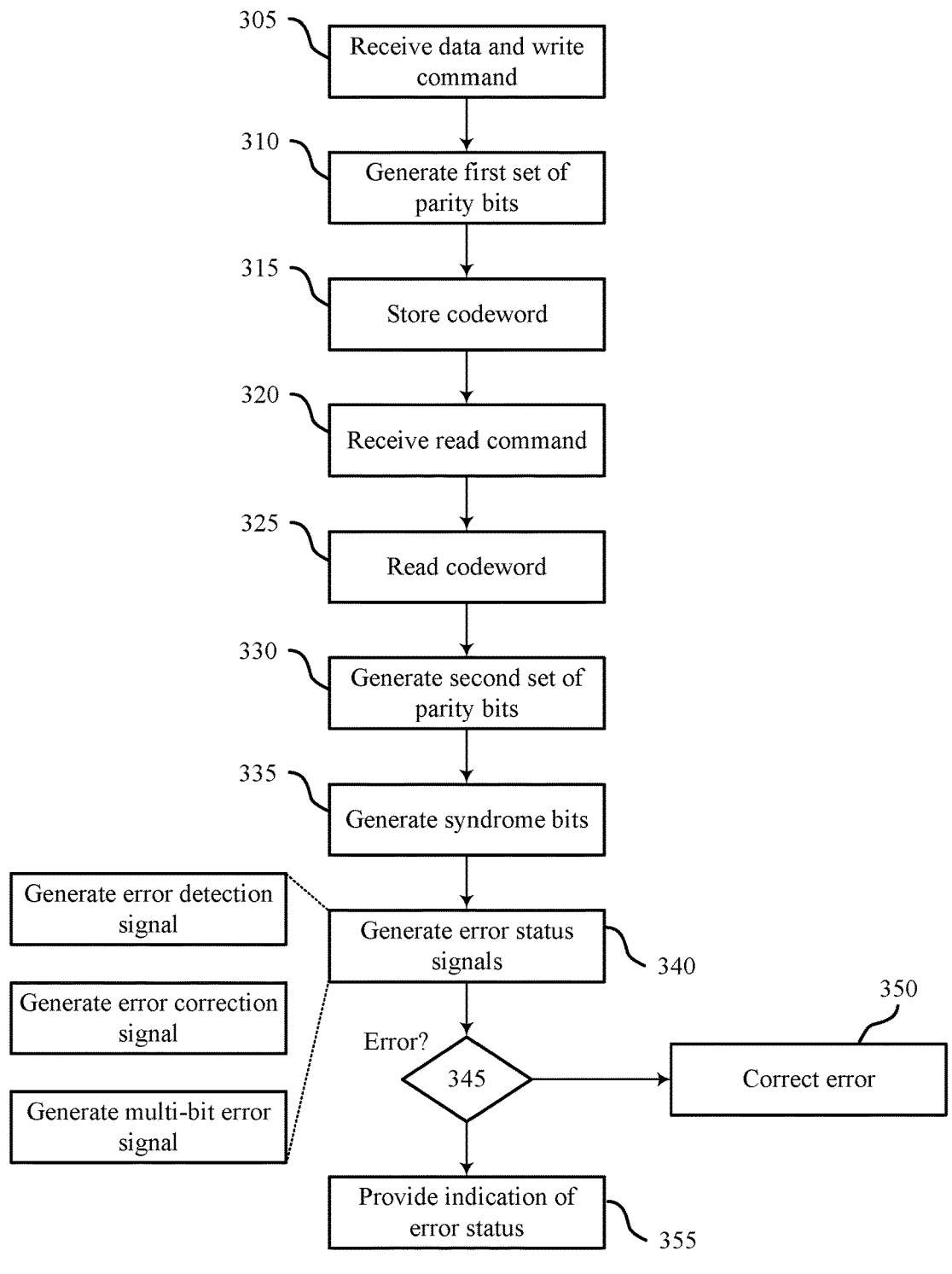
FIG. 3 illustrates an example of a process flow that supports error status determination at a memory device in accordance with examples as disclosed herein.

FIG. 3 illustrates an example of a process flow 300 that supports error status determination at a memory device in accordance with examples as disclosed herein. Aspects of the process flow 300 may be implemented by a memory device as described herein. For example, aspects of the process flow 300 may be implemented by the memory device 200 as described with reference to FIG. 2. By implementing aspects of the process flow 300, the memory device may generate signals that indicate the error status of a codeword requested by a host device.

At 305, the memory device may receive (e.g., from a host device) a write command and a set of data to be written to the memory device. At 310, the memory device may generate (e.g., via parity circuit 205-a) a first set of parity bits (e.g., Parity_1) that is based on the set of data (e.g., the logic values of the first set of parity bits may be a function of the logic values of bits in the set of data). At 315, the memory device may store the codeword (e.g., the set of data and the first set of parity bits) in a memory (e.g., the memory 210).

At 320, the memory device may receive a read command for the set of data. At 325, the memory device may (e.g., based on the read command) read the codeword from the memory. At 330, the memory device may generate (e.g., via the parity circuit 205-b) a second set of parity bits (Parity_2) that is based on the set of data read from the memory (e.g., the logic values of the second set of parity bits may be a function of the logic values of bits in the set of data). At 335, the memory device may generate (e.g., via the syndrome circuit 215) a set of syndrome bits for the codeword. The set of syndrome bits may be generated based on the first set of parity bits and the second set of parity bits (e.g., the logic values of the set of syndrome bits may be a function of the logic values of parity bits).

At 340, the memory device may generate one or more signals that are indicative of the error status of the codeword. For example, the memory device may generate (e.g., via the error detection signal circuit 225) the error detection signal. Additionally or alternatively, the memory device may generate (e.g., via the error correction signal circuit 230) the error correction signal. Additionally or alternatively, the memory device may generate (e.g., via the multi-bit error signal circuit 220, the circuit 240-a, or the circuit 240-b) the multi-bit error signal. The signal(s) may be generated based on the set of syndrome bits for the codeword.

At 345, the memory device may determine (e.g., via the correction circuit 235) whether the codeword has an error (e.g., a single-bit error). The memory device may determine whether the codeword has an error based on the set of syndrome bits and the SBE syndrome codes. If an error is detected in the codeword, the memory device may, at 350, correct (e.g., via the correction circuit 235) the error in the codeword. At 355, the memory device may transmit the codeword (or the set of data) to the host device as well as provide an indication of the error status of the codeword.

Thus, a memory device may generate signals that indicate the error status of a codeword. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
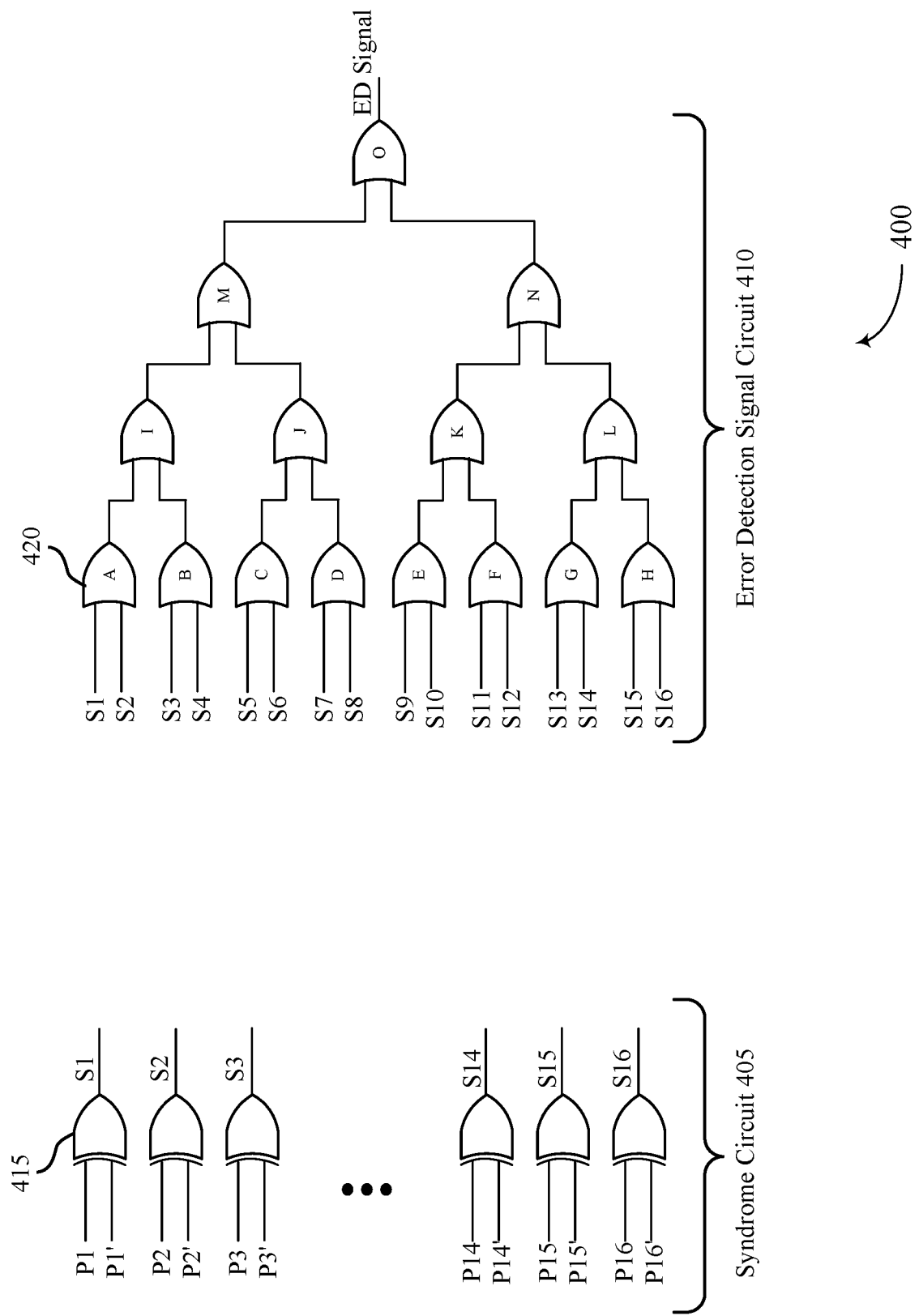
FIG. 4 illustrates an example of a logic circuit that supports error status determination at a memory device in accordance with examples as disclosed herein.

FIG. 4 illustrates an example of a logic circuit 400 that supports error status determination at a memory device in accordance with examples as disclosed herein. The logic circuit 400 may generate an error detection signal based on a first set of parity bits for a codeword (e.g., Parity_1) and a second set of parity bits for the codeword (e.g., Parity_2). Although illustrated with reference to sixteen parity bits per set, other quantities of parity bits are contemplated and within the scope of the present disclosure.

The logic circuit 400 may include a syndrome circuit 405 and an error detection signal circuit 410. The syndrome circuit 405 may generate syndrome bits for the codeword based on the first set of parity bits for a codeword and the second set of parity bits for the codeword (denoted by an apostrophe). The error detection signal circuit 410 may generate the error detection signal for the codeword based on the syndrome bits outputted by the syndrome circuit 405. In some examples, the input nodes of the logic gates in the error detection signal circuit 410 may be coupled with the output nodes of the logic gates in the syndrome circuit 405.

The syndrome circuit 405 may receive the first set of parity bits (P1 through P16) and the second set of parity bits (P1' through P16') and generate a set of syndrome bits (S1 through S16) based on the first set of parity bits and the second set of parity bits. For example, the syndrome circuit 405 may XOR (e.g., via XOR gates 415) each parity bit in the first set of parity bits with a corresponding parity bit in the second set of parity bits. To illustrate, a first syndrome bit (S1) may be generated by XORing the first parity bit (P1) in the first set of parity bits and the first parity bit (P1') in the second set of parity bits; a second syndrome bit (S2) may be generated by XORing the second parity bit (P2) in the first set of parity bits and the second parity bit (P2') in the second set of parity bits, and so on and so forth. If the codeword has an error at least one syndrome bit may be non-zero; if the codeword is errorless the set of syndrome bits may be zeros.

In some examples, the error detection signal circuit 410 may include a quantity of logic gates, such as OR gates 420, that are configured to perform a logic operation (e.g., an OR operation) on the syndrome bits. For example, if the syndrome bits include sixteen bits S1 through S16, the OR gates A through H may perform respective OR operations on different pairs of the syndrome bits. The OR gates I through L may perform respective OR operations on the bits outputted by the OR gates A through H. The OR gates M and N may perform respective OR operations on the bits outputted by the OR gates I through L. And the OR gate O may generate the error detection signal by performing an OR operation on the bits outputted by the OR gates M and N. Thus, the syndrome bits may be effectively ORed together. Other configurations of logic gates to generate the error detection signal are contemplated and within the scope of the present disclosure.

Thus, the logic circuit 400 may generate an error detection signal for a codeword based on a first set of parity bits for the codeword and a second set of parity bits for the codeword.

Figure 5:
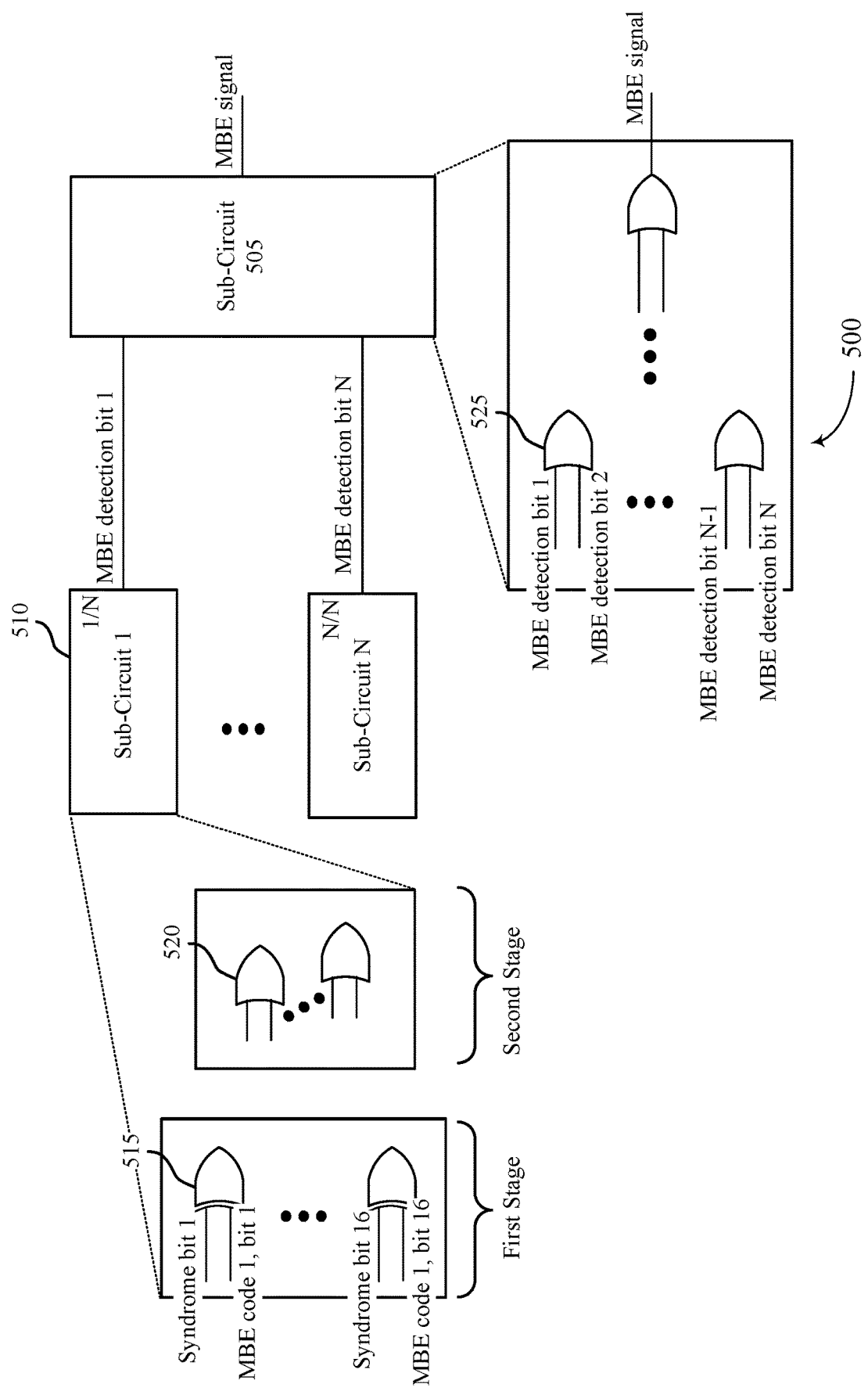
FIG. 5 illustrates an example of a logic circuit that supports error status determination at a memory device in accordance with examples as disclosed herein.

FIG. 5 illustrates an example of a logic circuit 500 that supports error status determination at a memory device in accordance with examples as disclosed herein. The logic circuit 500 may be an example of the multi-bit error signal circuit 220 as described with reference to FIG. 2. The logic circuit 500 may generate a multi-bit error signal based on a set of syndrome bits (e.g., 16 syndrome bits) for a codeword and a quantity of MBE syndrome codes (e.g., N MBE syndrome codes). If sixteen parity bits are used there may be N=65,279 MBE syndrome codes. If fifteen parity bits and a DED bit are used there may be N=32,510 MBE syndrome codes. Other quantities of syndrome bits and MBE codes are contemplated and within the scope of the present disclosure.

The logic circuit 500 may include a quantity of sub-circuits 510 (sub-circuit 1 through sub-circuit N) and a sub-circuit 505. The sub-circuits 510 may generate MBE detection bits for the codeword based on the syndrome bits for the codeword and the MBE syndrome codes. The sub-circuit 505 may generate the MBE signal for the codeword based on the MBE detection bits outputted by the sub-circuits 510. In some examples, the input nodes of the logic gates in the sub-circuit 505 may be coupled with the output nodes of the logic gates in the sub-circuits 510. In some examples, there may be one sub-circuit 510 circuit per MBE syndrome code (e.g., there may be N sub-circuits 510 and N MBE syndrome codes).

A sub-circuit 510 may include a first stage with a first set of logic circuits (e.g., XOR gates 515). The first stage may compare (e.g., XOR) the set of syndrome bits with an MBE syndrome code that is associated with a multi-bit error. For example, the first stage of sub-circuit 1 may compare the set of syndrome bits with the first MBE syndrome code (MBE syndrome code 1). Similarly, the first stage of sub-circuit N may compare the set of syndrome bits with the Nth MBE syndrome code (MBE syndrome code N). The first stage of a sub-circuit 510 may be similar to the syndrome circuit 405 and may include a quantity of XOR gates 515 configured to perform respective XOR operations on different pairs of syndrome bits and MBE syndrome code bits. If the set of syndrome bits matches (e.g., is equal to, is the same as) the MBE syndrome code compared by the first stage, the first stage may output a logic 1; otherwise, the first stage may output a logic 0.

The second stage of a sub-circuit 510 may include a second set of logic circuits (e.g., OR gates 520). The second stage of a sub-circuit 510 may generate an MBE detection bit by ORing the bits outputted by the first stage of the sub-circuit 510. The second stage of a sub-circuit 510 may be similar to the error detection signal circuit 410 and may include a quantity of OR gates 520 configured to perform respective OR operations on the bits outputted by the first stage. If any of the bits outputted by the first stage is a logic 1 the second stage may output a logic 1 (e.g., MBE detection bit 1=1); otherwise, the second stage may output a logic 0 (e.g., MBE detection bit 1=0).

The sub-circuit 505 may include a third set of logic gates (e.g., OR gates 525). The sub-circuit 505 may OR the MBE detection bits outputted by the sub-circuits 510. For example, the OR gates 525 of the sub-circuit 505 may OR the MBE detection bits 1 through N to generate the MBE signal for the codeword. The sub-circuit 505 may be similar to the error detection signal circuit 410. If any of the MBE detection bits outputted by the sub-circuits 510 is a logic 1, the sub-circuit 505 may output a logic 1; otherwise, the sub-circuit 505 may output a logic 0.

Thus, the logic circuit 500 may generate an MBE signal for a codeword based on a set of syndrome bits for the codeword and a quantity of MBE syndrome codes.

Figure 6:
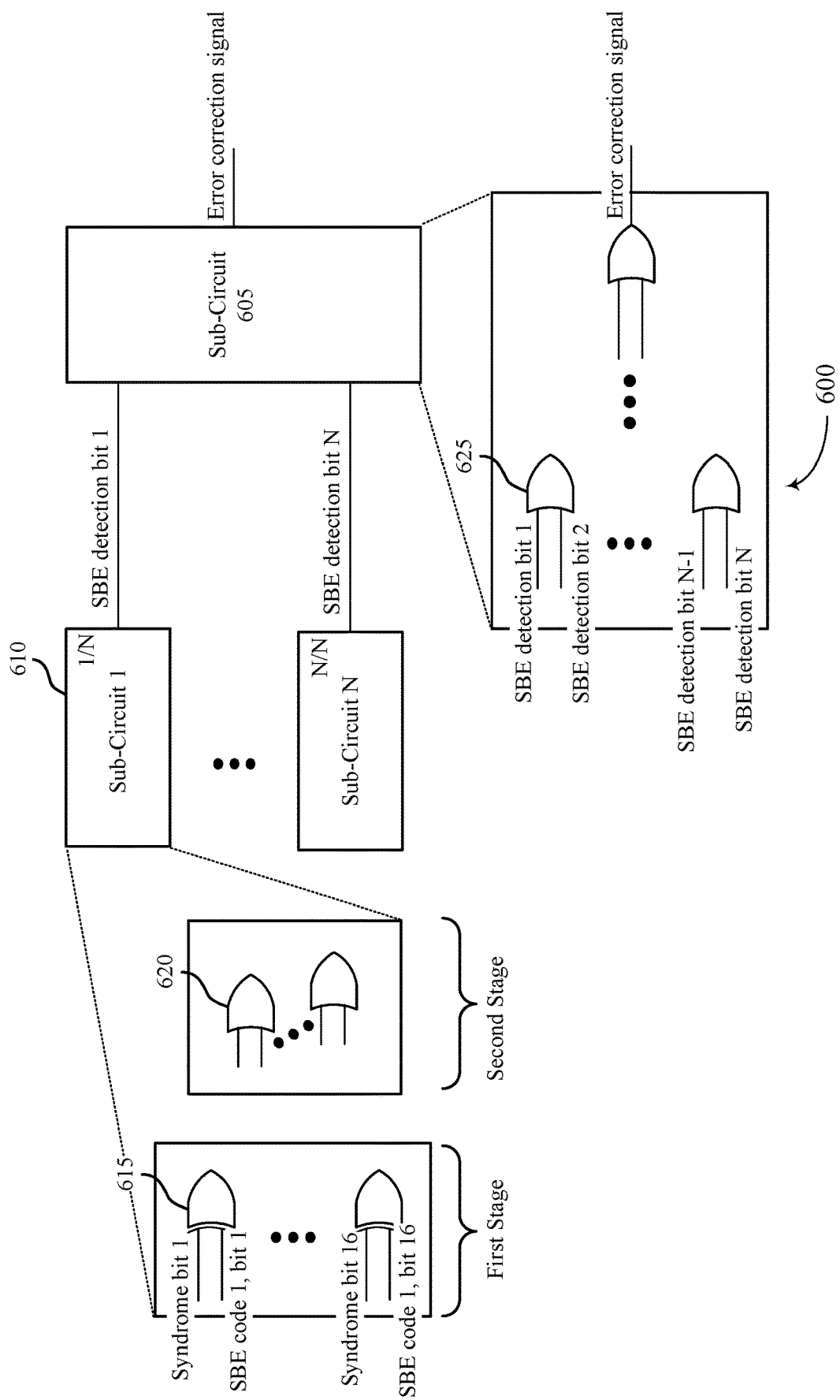
FIG. 6 illustrates an example of a logic circuit that supports error status determination at a memory device in accordance with examples as disclosed herein.

FIG. 6 illustrates an example of a logic circuit 600 that supports error status determination at a memory device in accordance with examples as disclosed herein. The logic circuit 600 may be an example of the error correction signal circuit 230 as described with reference to FIG. 2. The logic circuit 600 may generate an error correction signal based on a set of syndrome bits (e.g., 16 syndrome bits) for a codeword and a quantity of SBE syndrome codes (e.g., N SBE syndrome codes). If 256 data bits are in the codeword there may be N=256 SBE syndrome codes. Other quantities of syndrome bits, data bits, and SBE syndrome codes are contemplated and within the scope of the present disclosure. The logic circuit 600 may operate similar to the logic circuit 500.

The logic circuit 600 may include a quantity of sub-circuits 610 (sub-circuit 1 through sub-circuit N) and a sub-circuit 605. The sub-circuits 610 may generate SBE detection bits for the codeword based on the syndrome bits for the codeword and the SBE syndrome codes. The sub-circuit 605 may generate the SBE detection signal for the codeword based on the SBE detection bits outputted by the sub-circuits 610. In some examples, the input nodes of the logic gates in the sub-circuit 605 may be coupled with the output nodes of the logic gates in the sub-circuits 610. In some examples, there may be one sub-circuit 610 circuit per SBE syndrome code (e.g., there may be N sub-circuits 610 and N SBE syndrome codes).

A sub-circuit 610 may include a first stage with a first set of logic circuits (e.g., XOR gates 615). The first stage may compare (e.g., XOR) the set of syndrome bits with an SBE syndrome code that is associated with a single-bit error. For example, the first stage of sub-circuit 1 may compare the set of syndrome bits with the first SBE syndrome code (SBE syndrome code 1). Similarly, the first stage of sub-circuit N may compare the set of syndrome bits with the Nth SBE syndrome code (SBE syndrome code N). The first stage of a sub-circuit 610 may be similar to the syndrome circuit 405 and may include a quantity of XOR gates 615 configured to perform respective XOR operations on different pairs of syndrome bits and SBE syndrome code bits. If the set of syndrome bits matches (e.g., is equal to, is the same as) the SBE syndrome code compared by the first stage, the first stage may output a logic 1; otherwise, the first stage may output a logic 0.

The second stage of a sub-circuit 610 may include a second set of logic circuits (e.g., OR gates 620). The second stage of a sub-circuit 610 may OR the bits outputted by the first stage of the sub-circuit 610. The second stage of a sub-circuit 610 may be similar to the error detection signal circuit 410 and may include a quantity of OR gates 620 configured to perform respective OR operations on the bits outputted by the first stage. If any of the bits outputted by the first stage is a logic 1, the second stage may output a logic 1 (e.g., SBE detection bit 1=1); otherwise, the second stage may output a logic 0 (e.g., SBE detection bit 1=0).

The sub-circuit 605 may include a third set of logic gates (e.g., OR gates 625). The sub-circuit 605 may OR the SBE detection bits outputted by the sub-circuits 610. For example, the OR gates 625 of the sub-circuit 605 may OR the SBE detection bits 1 through N to generate the error correction signal for the codeword. The sub-circuit 605 may be similar to the error detection signal circuit 410. If any of the SBE detection bits outputted by the sub-circuits 610 is a logic 1, the sub-circuit 605 may output a logic 1; otherwise, the sub-circuit 605 may output a logic 0.

Thus, the logic circuit 600 may generate an error correction signal for a codeword based on a set of syndrome bits for the codeword and a quantity of SBE syndrome codes.

Figure 7:
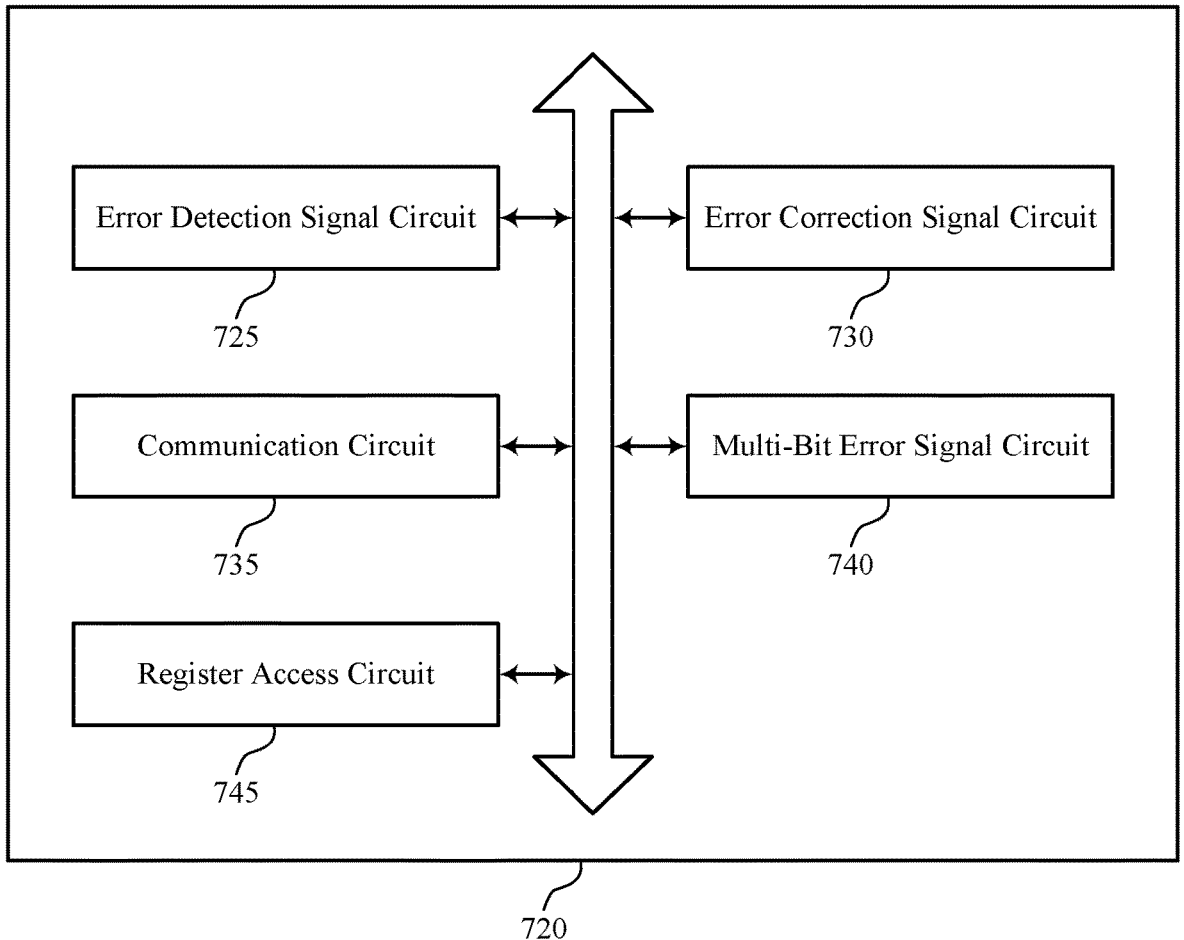
FIG. 7 illustrates a block diagram of a memory device that supports error status determination in accordance with examples as disclosed herein.

FIG. 7 illustrates a block diagram 700 of a memory device 720 that supports error status determination at a memory device in accordance with examples as disclosed herein. The memory device 720 may be an example of aspects of a memory device as described with reference to FIGS. 1 through 6. The memory device 720, or various components thereof, may be an example of means for performing various aspects of error status determination at a memory device as described herein. For example, the memory device 720 may include an error detection signal circuit 725, an error correction signal circuit 730, a communication circuit 735, a multi-bit error signal circuit 740, a register access circuit 745, or any combination thereof. Each of these components may communicate, directly or indirectly, with one another (e.g., via one or more buses).

The error detection signal circuit 725 may be configured as or otherwise support a means for generating, based at least in part on syndrome bits for a codeword read from a memory, an error detection signal for the codeword that indicates whether an error has been detected in the codeword. The error correction signal circuit 730 may be configured as or otherwise support a means for generating, based at least in part on the syndrome bits, an error correction signal for the codeword that indicates whether an error has been corrected in the codeword. The communication circuit 735 may be configured as or otherwise support a means for providing an indication of the error detection signal and an indication of the error correction signal to a host device.

In some examples, the multi-bit error signal circuit 740 may be configured as or otherwise support a means for generating a multi-bit error signal that indicates whether a multi-bit error has been detected in the codeword. In some examples, the communication circuit 735 may be configured as or otherwise support a means for transmitting the multi-bit error signal to the host device.

In some examples, the multi-bit error signal circuit 740 may be configured as or otherwise support a means for performing a logic operation on the error detection signal and the error correction signal, where the multi-bit error signal is generated based at least in part on performing the logic operation. In some examples, the logic operation includes an exclusive-OR (XOR) operation.

In some examples, the multi-bit error signal circuit 740 may be configured as or otherwise support a means for inverting the error correction signal. In some examples, the multi-bit error signal circuit 740 may be configured as or otherwise support a means for performing, after inverting the error correction signal, a logic operation on the error correction signal and the error detection signal, where the multi-bit error signal is generated based at least in part on performing the logic operation. In some examples, the logic operation includes an AND operation.

In some examples, the multi-bit error signal circuit 740 may be configured as or otherwise support a means for comparing the syndrome bits with multi-bit error codes that are associated with multi-bit errors, where the multi-bit error signal is generated based at least in part on the comparison.

In some examples, a set of bits is generated based at least in part the comparison, and the multi-bit error signal circuit 740 may be configured as or otherwise support a means for performing a logic operation on the set of bits, where the multi-bit error signal is based at least in part on performing the logic operation on the set of bits.

In some examples, the error detection signal circuit 725 may be configured as or otherwise support a means for performing a logic operation on the syndrome bits, where the error detection signal is generated based at least in part on performing the logic operation. In some examples, the logic operation includes an OR operation.

In some examples, the error correction signal circuit 730 may be configured as or otherwise support a means for comparing the syndrome bits with error-correction codes that are associated with different error locations, where the error correction signal is generated based at least in part on the comparison.

In some examples, the error correction signal circuit 730 may be configured as or otherwise support a means for generating a bit that indicates whether the codeword has an even or odd quantity of logic ones, where the error correction signal is generated based at least in part on the bit.

In some examples, to support providing an indication of the error detection signal and an indication of the error correction signal, the communication circuit 735 may be configured as or otherwise support a means for transmitting the indication of the error detection signal and the indication of the error correction signal to the host device. In some examples, to support providing an indication of the error detection signal and an indication of the error correction signal, the register access circuit 745 may be configured as or otherwise support a means for writing the indication of the error detection signal and the indication of the error correction signal to a register.

Figure 8:
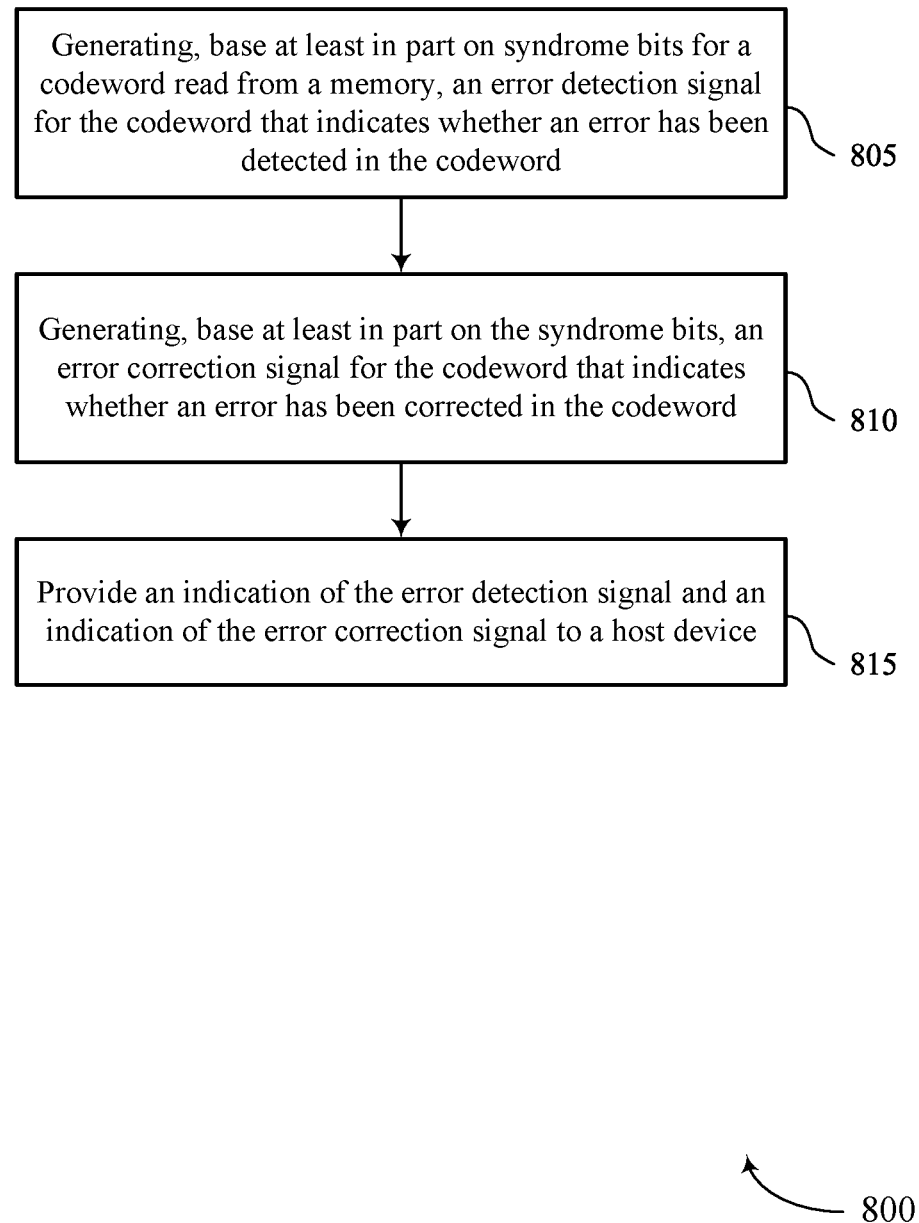
FIG. 8 illustrates a flowchart showing a method or methods that support error status determination at a memory device in accordance with examples as disclosed herein.

FIG. 8 illustrates a flowchart showing a method 800 that supports error status determination at a memory device in accordance with examples as disclosed herein. The operations of method 800 may be implemented by a memory device or its components as described herein. For example, the operations of method 800 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 805, the method may include generating, based at least in part on syndrome bits for a codeword read from a memory, an error detection signal for the codeword that indicates whether an error has been detected in the codeword. The operations of 805 may be performed in accordance with examples as disclosed herein. In some examples, aspects of the operations of 805 may be performed by an error detection signal circuit 725 as described with reference to FIG. 7.

At 810, the method may include generating, based at least in part on the syndrome bits, an error correction signal for the codeword that indicates whether an error has been corrected in the codeword. The operations of 810 may be performed in accordance with examples as disclosed herein. In some examples, aspects of the operations of 810 may be performed by an error correction signal circuit 730 as described with reference to FIG. 7.

At 815, the method may include providing an indication of the error detection signal and an indication of the error correction signal to a host device. The operations of 815 may be performed in accordance with examples as disclosed herein. In some examples, aspects of the operations of 815 may be performed by a communication circuit 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, based at least in part on syndrome bits for a codeword read from a memory, an error detection signal for the codeword that indicates whether an error has been detected in the codeword; generating, based at least in part on the syndrome bits, an error correction signal for the codeword that indicates whether an error has been corrected in the codeword; and providing an indication of the error detection signal and an indication of the error correction signal to a host device.

Aspect 2: The method, apparatus, or non-transitory computer-readable medium of aspect 1, further including operations, features, circuitry, logic, means, or instructions, or any combination thereof for generating a multi-bit error signal that indicates whether a multi-bit error has been detected in the codeword and transmitting the multi-bit error signal to the host device.

Aspect 3 The method, apparatus, or non-transitory computer-readable medium of aspect 2, further including operations, features, circuitry, logic, means, or instructions, or any combination thereof for performing a logic operation on the error detection signal and the error correction signal, where the multi-bit error signal is generated based at least in part on performing the logic operation.

Aspect 4: The method, apparatus, or non-transitory computer-readable medium of aspect 3, where the logic operation includes an exclusive-OR (XOR) operation.

Aspect 5: The method, apparatus, or non-transitory computer-readable medium of any of aspects 2 through 4, further including operations, features, circuitry, logic, means, or instructions, or any combination thereof for inverting the error correction signal and performing, after inverting the error correction signal, a logic operation on the error correction signal and the error detection signal, where the multi-bit error signal is generated based at least in part on performing the logic operation.

Aspect 6: The method, apparatus, or non-transitory computer-readable medium of aspect 5, where the logic operation includes an AND operation.

Aspect 7: The method, apparatus, or non-transitory computer-readable medium of any of aspects 2 through 6, further including operations, features, circuitry, logic, means, or instructions, or any combination thereof for comparing the syndrome bits with multi-bit error codes that are associated with multi-bit errors, where the multi-bit error signal is generated based at least in part on the comparison.

Aspect 8: The method, apparatus, or non-transitory computer-readable medium of aspect 7, where a set of bits is generated based at least in part the comparison and the method, apparatuses, and non-transitory computer-readable medium further includes operations, features, circuitry, logic, means, or instructions, or any combination thereof for performing a logic operation on the set of bits, where the multi-bit error signal is based at least in part on performing the logic operation on the set of bits.

Aspect 9: The method, apparatus, or non-transitory computer-readable medium of any of aspects 1 through 8, further including operations, features, circuitry, logic, means, or instructions, or any combination thereof for performing a logic operation on the syndrome bits, where the error detection signal is generated based at least in part on performing the logic operation.

Aspect 10: The method, apparatus, or non-transitory computer-readable medium of aspect 9, where the logic operation includes an OR operation.

Aspect 11: The method, apparatus, or non-transitory computer-readable medium of any of aspects 1 through 10, further including operations, features, circuitry, logic, means, or instructions, or any combination thereof for comparing the syndrome bits with error-correction codes that are associated with different error locations, where the error correction signal is generated based at least in part on the comparison.

Aspect 12: The method, apparatus, or non-transitory computer-readable medium of any of aspects 1 through 11, further including operations, features, circuitry, logic, means, or instructions, or any combination thereof for generating a bit that indicates whether the codeword has an even or odd quantity of logic ones, where the error correction signal is generated based at least in part on the bit.

Aspect 13: The method, apparatus, or non-transitory computer-readable medium of any of aspects 1 through 12, where and the method, apparatuses, and non-transitory computer-readable medium includes operations, features, circuitry, logic, means, or instructions, or any combination thereof for transmitting the indication of the error detection signal and the indication of the error correction signal to the host device and writing the indication of the error detection signal and the indication of the error correction signal to a register.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: a first set of logic gates (e.g., logic gates in the error detection signal circuit 410) configured to generate, based at least in part on syndrome bits for a codeword read from a memory, an error detection signal for the codeword that indicates whether an error has been detected in the codeword; a second set of logic gates (e.g., logic gates in the logic circuit 600) configured to generate, based at least in part on the syndrome bits, an error correction signal for the codeword that indicates whether an error has been corrected in the codeword; and one or more pins configured to transmit the error detection signal and the error correction signal to a host device.

Aspect 15: The apparatus of aspect 14, further including: a logic gate (e.g., XOR gate 245) configured to generate, based at least in part on the error detection signal and the error correction signal, a multi-bit error signal that indicates whether a multi-bit error has been detected in the codeword.

Aspect 16: The apparatus of aspect 15, where the logic gate includes an exclusive-OR (XOR) gate.

Aspect 17: The apparatus of any of aspects 14 through 16, further including: an inverter (e.g., inverter 250) configured to invert the error correction signal; and a logic gate (e.g., AND gate 255) configured to generate, based at least in part on the error detection signal and the inverted error correction signal, a multi-bit error signal that indicates whether a multi-bit error has been detected in the codeword.

Aspect 18: The apparatus of aspect 17, where the logic gate includes an AND gate.

Aspect 19: The apparatus of any of aspects 14 through 18, further including: a third set of logic gates (e.g., logic gates in the logic circuit 500) configured to compare the syndrome bits with a multi-bit error code that is associated with a multi-bit error; and a fourth set of logic gates configured to generate, based at least in part on the comparison, a multi-bit error signal that indicates whether a multi-bit error has been detected in the codeword.

Aspect 20: The apparatus of any of aspects 14 through 19, where the first set of logic gates includes: OR logic gates (e.g., OR gates 420) configured to perform an OR operation on the syndrome bits; where the first set of logic gates is configured to generate the error detection signal based at least in part on performing the OR operation.

Aspect 21: The apparatus of any of aspects 14 through 20, where the second set of logic gates includes: a first subset of logic gates (e.g., XOR gates 615) configured to compare the syndrome bits with an error-correction code that is associated with an error location; and a second subset of logic gates (e.g., OR gates 620, OR gates 625) configured to perform a logic operation on a set of bits generated by the first subset of logic gates, where the second set of logic gates is configured to generate the error correction signal based at least in part on the comparison.

An apparatus is described. The following provides an overview of aspects of the apparatus as described herein:

Aspect 22: An apparatus, including: a memory; and a controller coupled with the memory and configured to cause the apparatus to: generate, based at least in part on syndrome bits for a codeword read from the memory, an error detection signal for the codeword that indicates whether an error has been detected in the codeword; generate, based at least in part on the syndrome bits, an error correction signal for the codeword that indicates whether an error has been corrected in the codeword; and provide an indication of the error detection signal and an indication of the error correction signal to a host device.

Aspect 23: The apparatus of aspect 22, where the controller is configured to cause the apparatus to: generate a multi-bit error signal that indicates whether a multi-bit error has been detected in the codeword; and transmit the multi-bit error signal to the host device.

Aspect 24: The apparatus of aspect 23, where the controller is configured to cause the apparatus to: perform a logic operation on the error detection signal and the error correction signal, where the multi-bit error signal is generated based at least in part on performing the logic operation.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOT) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   generating, based at least in part on ORing a first subset of syndrome bits for a codeword with a second subset of the syndrome bits for the codeword, an error detection signal for the codeword that indicates whether an error has been detected in the codeword;
   generating, based at least in part on comparing the syndrome bits with a plurality of error-correction codes each of which is associated with a different error location, an error correction signal for the codeword that indicates whether an error has been corrected in the codeword; and
   providing an indication of the error detection signal and an indication of the error correction signal to a host device.

2. The method of claim 1, further comprising:
   generating a multi-bit error signal that indicates whether a multi-bit error has been detected in the codeword; and
   transmitting the multi-bit error signal to the host device.

3. The method of claim 2, further comprising:
   performing a logic operation on the error detection signal and the error correction signal, wherein the multi-bit error signal is generated based at least in part on performing the logic operation.

4. The method of claim 3, wherein the logic operation comprises an exclusive-OR (XOR) operation.

5. The method of claim 2, further comprising:
   inverting the error correction signal; and
   performing, after inverting the error correction signal, a logic operation on the error correction signal and the error detection signal, wherein the multi-bit error signal is generated based at least in part on performing the logic operation.

6. The method of claim 5, wherein the logic operation comprises an AND operation.

7. The method of claim 2, further comprising:
   comparing the syndrome bits with multi-bit error codes that are associated with multi-bit errors, wherein the multi-bit error signal is generated based at least in part on the comparison.

8. The method of claim 7, wherein a set of bits is generated based at least in part on the comparison, the method further comprising:
   performing a logic operation on the set of bits, wherein the multi-bit error signal is based at least in part on performing the logic operation on the set of bits.

9. The method of claim 1, further comprising:
   generating a bit that indicates whether the codeword has an even or odd quantity of logic ones, wherein the error correction signal is generated based at least in part on the bit.

10. The method of claim 1, wherein providing the indication of the error detection signal and the indication of the error correction signal comprises at least one of:
    transmitting the indication of the error detection signal and the indication of the error correction signal to the host device; or
    writing the indication of the error detection signal and the indication of the error correction signal to a register.

11. An apparatus, comprising:
    a first set of logic gates configured to:
       perform an OR operation on a first subset of syndrome bits for a codeword and a second subset of the syndrome bits for the codeword; and
       generate, based at least in part on the OR operation, an error detection signal for the codeword that indicates whether an error has been detected in the codeword;
    a second set of logic gates configured to:
       compare the syndrome bits with a plurality of error-correction codes each of which is associated with a different error location; and
       generate, based at least in part on the comparison, an error correction signal for the codeword that indicates whether an error has been corrected in the codeword; and
    one or more pins configured to transmit the error detection signal and the error correction signal to a host device.

12. The apparatus of claim 11, further comprising:
    a logic gate configured to generate, based at least in part on the error detection signal and the error correction signal, a multi-bit error signal that indicates whether a multi-bit error has been detected in the codeword.

13. The apparatus of claim 12, wherein the logic gate comprises an exclusive-OR (XOR) gate.

14. The apparatus of claim 11, further comprising:
    an inverter configured to invert the error correction signal; and
    a logic gate configured to generate, based at least in part on the error detection signal and the inverted error correction signal, a multi-bit error signal that indicates whether a multi-bit error has been detected in the codeword.

15. The apparatus of claim 14, wherein the logic gate comprises an AND gate.

16. The apparatus of claim 11, further comprising:
    a third set of logic gates configured to compare the syndrome bits with a multi-bit error code that is associated with a multi-bit error; and
    a fourth set of logic gates configured to generate, based at least in part on the comparison, a multi-bit error signal that indicates whether a multi-bit error has been detected in the codeword.

17. The apparatus of claim 11, wherein the first set of logic gates comprises:
    OR logic gates configured to perform the OR operation on the first subset of syndrome bits and the second subset of syndrome bits.

18. The apparatus of claim 11, wherein the second set of logic gates comprises:
    a first subset of logic gates configured to compare the syndrome bits with an error-correction code, of the plurality of error-correction codes, that is associated with an error location; and
    a second subset of logic gates configured to perform a logic operation on a set of bits generated by the first subset of logic gates, wherein the second set of logic gates is configured to generate the error correction signal based at least in part on the comparison.

19. An apparatus, comprising:
    a memory; and a controller coupled with the memory and configured to cause the apparatus to:
- generate, based at least in part on ORing a first subset of syndrome bits for a codeword with a second subset of the syndrome bits for the codeword, an error detection signal for the codeword that indicates whether an error has been detected in the codeword;
- generate, based at least in part on comparing the syndrome bits with a plurality of error-correction codes each of which is associated with a different error location, an error correction signal for the codeword that indicates whether an error has been corrected in the codeword; and
- provide an indication of the error detection signal and an indication of the error correction signal to a host device.

20. The apparatus of claim 19, wherein the controller is configured to cause the apparatus to:
generate a multi-bit error signal that indicates whether a multi-bit error has been detected in the codeword; and
transmit the multi-bit error signal to the host device.

21. The apparatus of claim 20, wherein the controller is configured to cause the apparatus to:
perform a logic operation on the error detection signal and the error correction signal, wherein the multi-bit error signal is generated based at least in part on performing the logic operation.

* * * * *